P. SUBIT.
Belt-Fastenings.

No. 143,474. Patented Oct. 7, 1873.

WITNESSES
Melville Church
Peter Ward

INVENTOR
P. Subit
by C. F. Brown
Attorney.

UNITED STATES PATENT OFFICE.

PETER SUBIT, OF BOSTON, MASSACHUSETTS.

IMPROVEMENT IN BELT-FASTENINGS.

Specification forming part of Letters Patent No. 143,474, dated October 7, 1873; application filed March 3, 1873.

*To all whom it may concern:*

Figure 1:
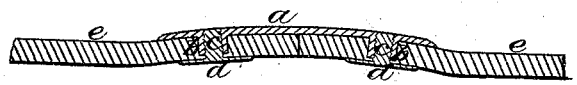
Figure 2:
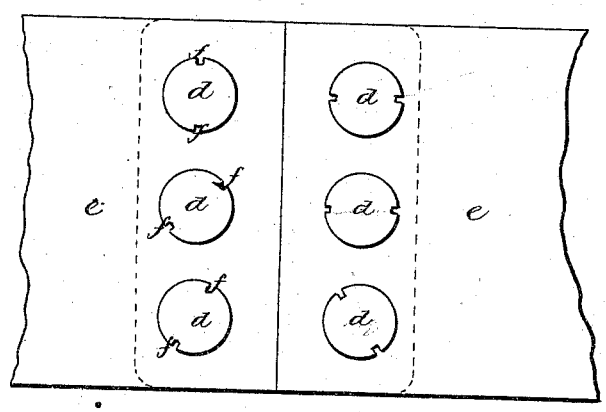

Be it known that I, PETER SUBIT, of Boston, in the county of Suffolk and State of Massachusetts, have invented certain Improvements in Belt-Locks, of which the following is a specification:

Figure 1 of the accompanying drawing is a central vertical longitudinal section through a portion of a belt, showing the attachment of my improved belt-lock. Fig. 2 is a bottom view of the belt, showing the heads of the screws.

This invention relates to that class of belt-locks for connecting the ends of belting material together in which a metallic plate or plates are employed, to which the ends of the belt are suitably clamped. It has been usual in belt-locks of this description to construct the plate or plates with flat or plane sides, which, in passing over pulleys of small diameter, are liable to strain the belt at the points where it is attached to the plates, the latter being rigid and unyielding. It has also been usual to employ a number of these plates at each junction of the belt—that is to say, two or more narrow plates located side by side. By this arrangement the ends of the belt are liable to lateral displacement, such displacement producing projecting corners, which are liable to come in contact with any object which may be in the way, often resulting in serious injury. My invention has for its object to obviate the difficulties above referred to, and produce for the public a belt-lock which shall be readily attached, strong, and durable. To this end it consists of a single metal plate about the same length as the width of the belt to which it is applied, curved longitudinally of the belt sufficiently to adapt it to the periphery of the pulleys around which it passes, and provided with transverse rows of screw-sockets projecting inward from its concave side, the rows being sufficiently far apart to pass through the opposite ends of the belt and hold the same in connection with suitable screws, as I will now proceed to describe.

In the drawings, $a$ represents a rectangular or other shaped metal plate sufficiently long to extend across the belt, and provided on its inner side with projecting screw-sockets $b$, the latter being disposed, if desired, in two parallel rows, one near each edge of the plate $a$, transversely of the belt $e$. The plate $a$ is curved longitudinally of the belt, as shown in Fig. 1, and is thus adapted to conform to the periphery of the pulleys or drums around which the belt passes. $d$ are screws having enlarged and thin filester-heads $d$, which screws are inserted in the sockets $b$. It will be readily seen that the plate $a$ is attached to the belt by placing the sockets $b$ in holes punctured in the belt, and, by turning the screws $c$ in said sockets, the belt is firmly clamped between the heads of the screws and the plate. The proximate ends of the belt are thus rigidly held and cannot become displaced laterally, and the curved form of the plate adapts it to the periphery of the pulleys, and prevents the orifices in the belt from being torn or stretched. By the employment of but one plate and the thin-headed screws, inconvenient protuberances are avoided on the inner side of the belt, as the screw-heads $d$ are so thin that, when screwed home tightly, they do not project sufficiently to produce any injurious effect.

Having thus described my invention, what I claim as new is—

In a belt-lock, the combination of the single curved plate $a$, provided on its concave side with projecting screw-sockets $b$, with the screws $c$, having enlarged flat heads $d$, substantially as described, for the purpose specified.

In testimony whereof I have signed my name to this specification in the presence of two subscribing witnesses.

PETER SUBIT.

Witnesses:
  CARROLL D. WRIGHT,
  SAML. M. BARTON.